United States Patent Office 2,913,371
Patented Nov. 17, 1959

2,913,371

FUMIGANT COMPOSITION AND METHOD

Clayton Peters, Sheridan, Mich., assignor to The Dow Chemical Company, Midland, Mich., a corporation of Delaware No Drawing. Application April 30, 1956
Serial No. 581,391

2 Claims. (Cl. 167—39)

This invention is concerned with improved fumigant mixtures and is particularly directed to compositions containing carbon disulfide, characterized by improved flash and fire points, and to a method for elevating the flash and fire points of such mixtures.

In recent years, the continued production of surplus farm produce such as grains has emphasized the need for fumigant materials for protecting stored products against attack by insect pests. Numerous fumigant compositions have been proposed for such use. Among these, mixtures embodying varying amounts of carbon disulfide have been of interest because of the desirable properties of the latter compound as an insecticidal fumigant. For example, carbon disulfide volatilizes readily and its vapors have been found to be highly toxic to insects and to penetrate readily into masses of stored grain. Further, the use of carbon disulfide is favored by its relatively low cost and by the fact that mixtures containing effective amounts of carbon disulfide retain their insecticidal efficiency at lower temperatures than with many other fumigant toxicants.

The widespread use of fumigant mixtures containing carbon disulfide has been hindered by the fire hazard attendant on the employment of this highly volatile and readily ignitible material. Thus, it has been found that mixtures containing only about 16 percent by weight of carbon disulfide in admixture with non-flammable agents such as carbon tetrachloride have flash and fire points of 10° F. or lower by the Cleveland Open-Cup method.

It is an object of the present invention to provide improved fumigant compositions containing carbon disulfide and characterized by elevated flash points. It is a further object to provide a method for diminishing the fire hazard in the use of carbon disulfide fumigants. Other objects will become apparent from the following specification and claims.

According to the present invention, it has been discovered that the incorporation of small amounts of methyl bromide or ethyl bromide in conventional fumigant mixtures containing carbon disulfide results in marked increases in the flash point temperature of such mixtures. Thus, improved fumigant compositions are provided which comprise a mixture of carbon tetrachloride and carbon disulfide as a major toxic ingredient and which contain a small amount of methyl bromide or ethyl bromide as a flash and fire suppressant agent. The new fumigants have been found to have markedly improved flash and fire points while retaining excellent activity for the control of grain parasites, particularly in storage bin fumigation. It is among the advantages of the invent that the flash and fire suppressant agents are employed in only small amounts and that pressure containers are not required for the fumigant compositions. The expression "flash suppressant" is employed herein in the sense that a flash suppressant agent serves to increase numerically the flash point of a composition in which such agent is incorporated.

In carrying out the invention, the carbon tetrachloride and carbon disulfide components of the composition are mixed together at room temperature or below and the methyl or ethyl bromide is added in gaseous or liquid form. Alternatively, the required amount of the aliphatic bromide may be dissolved in carbon disulfide and the resulting solution mixed with carbon tetrachloride to prepare the final composition. The aliphatic bromide ingredients dissolve readily in the fumigant composition under the above conditions in the required proportions. Other fumigant ingredients such as methylene chloride, ethylene bromide, ethylene chloride, propylene chloride and the like may be incorporated in the compositions, if desired. In practice, it is convenient to mix the liquid ingredients on a weight or volume basis to produce a fumigant mixture containing the proper proportions of said ingredients and thereafter to add the required weight of methyl bromide or ethyl bromide to complete the composition.

Any suitable proportion of ingredients may be employed in the fumigant compositions provided a flash suppressant amount of methyl bromide or ethyl bromide is incorporated. The fumigant formulations to which the invention is particularly applicable are those comprising as a major toxic ingredient a composition consisting of from about 70 to 90 percent by weight of carbon tetrachloride and from about 10 to 30 percent by weight of carbon disulfide. In general, the desirable properties with respect to improved flash point are obtained when at least about 0.25 percent by weight of methyl bromide or at least 1 percent by weight of ethyl bromide is admixed with a carbon tetrachloride-carbon disulfide composition as set forth above. For reasons of economy, it is preferred to employ not more than 4 percent by weight of methyl or ethyl bromide although larger amounts may be employed with continued good results as regards fire and flash suppressant action.

The following examples illustrate the invention but are not to be construed as limiting the same.

*Example 1*

The following fumigant composition was prepared by mixing the ingredients at room temperature.

| Compound: | Percent by weight |
|---|---|
| Carbon tetrachloride | 82.46 |
| Carbon disulfide | 16.54 |
| Ethyl bromide | 1.00 |

This composition was found to have a flash point of 55° F. and a fire point of 55° F. by the Cleveland Open Cup method. A commercial grain fumigant containing 83.46 percent by weight of carbon tetrachloride and 16.54 percent by weight of carbon disulfide had a flash point of 9° F. and a fire point of 10° F. by said method.

*Example 2*

The following series of fumigant compositions was prepared. Where methyl bromide was employed, it was cooled to below 0° C. and added as a liquid to the other liquid ingredients.

| Compound | Percent by Weight in Composition: | | | | |
|---|---|---|---|---|---|
| | 1 | 2 | 3 | 4 | 5 |
| Carbon tetrachloride | 81.5 | 79.5 | 79.5 | 82.5 | 83.21 |
| Carbon disulfide | 16.5 | 16.5 | 16.5 | 16.5 | 16.54 |
| Methyl bromide | | | 4.0 | 1.0 | 0.25 |
| Ethyl bromide | 2.0 | 4.0 | | | |

All the above compositions were tested by the Cleveland Open Cup method and found to have no flash point, that is, no flash occurred up to the boiling point of the composition. These fumigants boiled in the range of 130° to 150° F.

*Example 3*

The following compositions are prepared by mixing together the liquid ingredients at room temperature and adding the required amount of gaseous methyl bromide through a sparger introduced below the surface of the liquid mixture. The methyl bromide dissolves readily to form the finished composition. All quantities in the following are parts by weight.

Composition A:
- Carbon tetrachloride _____ 77.0
- Carbon disulfide _____ 16.0
- Ethylene bromide _____ 5.0
- Methyl bromide _____ 2.0

Composition B:
- Carbon tetrachloride _____ 72.0
- Carbon disulfide _____ 18.0
- Ethylene bromide _____ 6.0
- Methyl bromide _____ 4.0

Composition C:
- Carbon tetrachloride _____ 80.3
- Carbon disulfide _____ 12.1
- Ethylene bromide _____ 6.6
- Methyl bromide _____ 1.0

The above compositions show increased flash point temperatures by the Cleveland Open Cup method in comparison to corresponding compositions containing the same proportions of carbon tetrachloride, carbon disulfide and ethylene bromide but without methyl bromide.

All the compositions of the preceding examples display excellent fumigant activity for the control of insects such as flour beetles and grain weevils in stored grain.

I claim:

1. A fumigant composition which comprises a mixture of from about 70 to 90 percent by weight of carbon tetrachloride and from about 10 to 30 percent by weight of carbon disulfide as a major toxic ingredient and as a minor ingredient from about 0.25 to about 4 percent by weight of methyl bromide.

2. A method for elevating the flash and fire points of fumigant mixtures comprising mixtures of carbon tetrachloride and carbon disulfide containing from about 10 to 30 percent by weight of carbon disulfide which comprises incorporating in said mixture at least about 0.25 percent by weight of methyl bromide.

References Cited in the file of this patent

UNITED STATES PATENTS 2,391,890   Fletcher _____ Jan. 1, 1946

OTHER REFERENCES

U.S. Dept. Agri. Bull. No. 1313, January 26, 1925, pp. 25, 28, 29, 34.

Busbey: "Methyl Bromide as an Insect Fumigant, a Rev. of Lit. Thru 1940," USDA Pub. E–618, May 1944, pp. 1 and 2.

Fisk et al.: J. Econ. Ent. vol 31, No. F, February 1938, pp. 79–84.

Richardson: J. Econ. Ent., vol. 36, June 1943, p. 421.